(12) United States Patent
Holm-Christensen et al.

(10) Patent No.: US 10,082,289 B2
(45) Date of Patent: Sep. 25, 2018

(54) BURNER

(71) Applicant: Haldor Topsøe A/S, Kgs. Lyngby (DK)

(72) Inventors: Olav Holm-Christensen, Fredensborg (DK); Michael Boe, Klampenborg (DK)

(73) Assignee: Haldor Topsoe A/S, Lyngby (DK)

( * ) Notice: Subject to any disclaimer, the term of this patent is extended or adjusted under 35 U.S.C. 154(b) by 87 days.

(21) Appl. No.: 14/939,567

(22) Filed: Nov. 12, 2015

(65) Prior Publication Data
US 2016/0061443 A1 Mar. 3, 2016

Related U.S. Application Data

(63) Continuation of application No. PCT/EP2014/060811, filed on May 26, 2014.

(30) Foreign Application Priority Data

Jun. 7, 2013 (EP) .................... 13171027

(51) Int. Cl.
| | |
|---|---|
| *C10L 1/12* | (2006.01) |
| *F23D 14/08* | (2006.01) |
| *F23D 14/22* | (2006.01) |
| *F23D 99/00* | (2010.01) |
| *C01B 3/38* | (2006.01) |
| *F23D 14/58* | (2006.01) |

(52) U.S. Cl.
CPC .............. *F23D 14/08* (2013.01); *C01B 3/38* (2013.01); *F23D 14/22* (2013.01); *F23D 14/58* (2013.01); *F23D 91/02* (2015.07); *C01B 2203/0227* (2013.01); *C01B 2203/0838* (2013.01); *C01B 2203/1241* (2013.01); *F23D 2900/14064* (2013.01)

(58) Field of Classification Search
USPC .......... 431/10, 11, 2, 354, 7, 8, 121; 60/299; 110/345
See application file for complete search history.

(56) References Cited

U.S. PATENT DOCUMENTS

| | | | |
|---|---|---|---|
| 5,562,437 A | 10/1996 | Gauthier et al. | |
| 6,174,159 B1* | 1/2001 | Smith | F23C 13/00 431/170 |
| 6,394,791 B2* | 5/2002 | Smith | F23C 6/04 431/170 |
| 2007/0089417 A1* | 4/2007 | Khanna | F23C 13/06 60/723 |
| 2010/0104990 A1* | 4/2010 | Sarmiento-Darkin | F23D 14/22 431/8 |

FOREIGN PATENT DOCUMENTS

| | | |
|---|---|---|
| DE | 198 50 940 A1 | 5/2000 |
| EP | 1 783 426 A1 | 5/2007 |
| EP | 2 362 139 A1 | 8/2011 |

* cited by examiner

*Primary Examiner* — Vivek Shirsat
(74) *Attorney, Agent, or Firm* — Blank Rome LLP

(57) ABSTRACT

A burner with a plurality of oxidant gas pipes distributed throughout the cross section of the burner and process gas in plug flow provides even mixing of the oxidant and the process gas.

16 Claims, 2 Drawing Sheets

BURNER

This is a continuation of International Application No. PCT/EP2014/060811, filed May 26, 2014, which claims priority to European Patent Application No. 13171027.9, filed on Jun. 7, 2013, the disclosures of which are incorporated by reference in their entireties.

BACKGROUND OF THE INVENTION

1. Field of the Invention

The present invention concerns a burner for a catalytic reactor, in particular a burner for use in secondary reformers.

2. Description of the Related Art

Burners for combustion of a reactant are mainly used for firing gas-fuelled industrial furnaces and process heaters, which require a stable flame with high combustion intensities. Such burners include a burner tube with a central tube for fuel supply surrounded by an oxidiser supply port. Intensive mixing of fuel and oxidiser in a combustion zone is achieved by passing the oxidiser through a swirler installed at the burner face on the central tube. The stream of oxidiser is, thereby, given a swirling-flow, which provides a high degree of internal and external recirculation of combustion products and a high combustion intensity.

More particular, burners for use in secondary reformers comprise burners in ammonia plants, where the methane reforming reaction from the tubular reformer is continued in the secondary reformer via the introduction of oxidant, i.e. air to the process stream for the reactor, hereby adding the nitrogen for the downstream ammonia loop and raising the temperature for the reforming process to take place in the secondary reformer catalyst bed, by combustion of the oxygen content. For this application a conventional burner is a nozzled ring burner. The nozzled ring type burner is equipped with specially designed nozzles installed on each of the air distribution holes, and seeks to achieve mixing at the burner nozzles, low metal temperatures of the burner, equal gas temperature distribution at the inlet to the catalyst bed and protection of the refractory lining from the hot flame core. Only a part of the process gas is combusted in the secondary reformer, whereas the remaining part flows further to the catalyst bed and to the steam reforming reaction.

The catalyst bed in the secondary reformer is covered with perforated refractory tiles in order to keep the catalyst in place. The very high temperatures in the secondary reformer cause the refractory tiles to slowly loose material by evaporation, and this material is later deposited by condensation in the catalyst bed below, where the temperature is dropping due to the heat consuming steam reforming reaction taking place here. The unwanted result is an increase in catalyst bed pressure drop, which eventually may lead to shut down of the plant in order to remove the deposited material.

The design of the burner is important to minimize the problem of catalyst bed pressure drop increase by the mechanism described above. Temperatures where process gas meets oxidant gas can locally rise to more than 2500° C., and it is very important to have good mixing downstream the point/points of initial contact between process gas and oxidant gas. Ideally all the process gas and combusted process gas are mixed to one mixture, with—the lowest possible—uniform temperature before the total gas flow reaches the layer of refractory tiles. This situation will give the lowest possible transport of material from refractory tiles to the catalyst bed. In comparison when a not fully mixed gas flow reaches the tiles there will be areas at lower temperatures and areas of higher temperatures than the uniform temperature. Compared to the situation of uniform temperature the situation with uneven temperatures causes a higher material loss from the tiles, because the transport mechanism accelerates dramatically by increasing temperature, and the increased material loss from hot areas therefore far outweigh the reduced material loss from cold areas.

A reduction in pressure drop over the burner on both the oxidant gas side and process gas side is often a benefit. When the pressure drop is reduced, it means that the maximum flow rate can be increased if the compression stage is the bottle neck of the plant. Some ammonia plants are running their oxidant gas compressor at maximum, and a decreased oxidant gas side pressure drop means that more oxidant gas can be supplied to the process gas stream. The process gas stream can be increased similarly to keep the ratio between nitrogen and hydrogen constant, and the effect is an increased ammonia production. If a flow increase is not of value, the reduced pressure drop will in most cases mean a cost reduction related to the reduction of compression energy needed.

A swirling burner for use in small and medium scale applications with substantially reduced internal recirculation of combustion products toward the burner face is disclosed in U.S. Pat. No. 5,496,170. The burner design disclosed in this patent results in a stable flame with high combustion intensity and without detrimental internal recirculation of hot combustion products by providing the burner with a swirling-flow of oxidiser having an overall flow direction concentrated along the axis of the combustion zone and at the same time directing the process gas flow towards the same axis. The disclosed swirling-flow burner comprises a burner tube and a central oxidiser supply tube concentric with and spaced from the burner tube, thereby defining an annular process gas channel between the tubes, the oxidiser supply tube and the process gas channel having separate inlet ends and separate outlet ends. U-shaped oxidiser and fuel gas injectors are arranged coaxial at the burner face. The burner is further equipped with a bluff body with static swirler blades extending inside the oxidiser injector. The swirler blades are mounted on the bluff body between their upstream end and their downstream end and extend to the surface of the oxidiser injection chamber.

US2002086257 discloses a swirling-flow burner with a burner tube comprising a central oxidiser supply tube and an outer concentric fuel supply tube, the oxidiser supply tube being provided with a concentric cylindrical guide body having static swirler blades and a central concentric cylindrical bore, the swirler blades extending from outer surface of the guide body to inner surface of oxidiser supply tube being concentrically arranged within space between the guide body and inner wall at lower portion of the oxidiser supply tube.

EP0685685 describes a gas injector nozzle comprising a discharge chamber with a cylindrical inner wall and having at its outlet end a circular gas discharge orifice, an outer wall concentrically surrounding the inner wall, the outer wall following a continuously curved path at a region at the chamber outlet end and being joint sharp-edged with the inner wall at the discharge orifice, wherein the curved path has a specific curvature radius.

Despite the above mentioned attempts to overcome the described problems related to burners, the burners of the known art design have been known to be challenged in cases where the operating conditions are particularly challenging.

SUMMARY OF THE INVENTION

Thus, the main object of the invention is to obtain a burner design, which overcomes the above mentioned problems.

Accordingly, this invention is a burner according to the embodiments of the claims which comprises the advantages of:

Low pressure drop of oxidant gas—by low flow speed on oxidant gas side; no turns to be made by the oxidant gas; similar flow path for all oxidant gas sub streams through same length, straight pipes.

Low process gas pressure drop, while effectively creating a plug flow—in one embodiment by two perforated plates with reduced wall leakage compared to one perforated plate.

Both of the above, while achieving the overall goal of having fairly uniform temperatures across the refractory tile layer of the reactor.

Successful mixing of process gas and oxidant gas is achieved through one of two routes. One approach is to spend substantial amounts of energy to create significant turbulence, whereby the oxidant gas stream is effectively mixed into the process gas stream in the course of a short flow path (in the limited space before the process gas passes the refractory tiles). Examples of this approach is seen in designs utilizing static mixers, swirlers, injectors or simply zones of significantly increased flow speeds.

The other approach is to subdivide the smaller oxidant gas stream into many sub streams and supply these throughout the process gas flow cross section in a well distributed manner. Each small sub stream of oxidant gas mixes into the surrounding process gas flow. The amounts of oxidant gas and process gas are balanced in the same way throughout the entire cross section, which lead to the same temperature everywhere. The required flow path length to achieve complete mixing of such sub divided oxidant gas streams into the surrounding process gas becomes smaller as the number of sub streams increase. This is a natural consequence of the reduced distance (perpendicular to flow direction) between the oxidant gas and process gas that needs to meet and combust/mix.

The current invention falls in the second category of the above described, because we seek to have uniform temperatures at the level of the refractory tiles while paying the smallest price in terms of pressure drop.

The invention comprises a number of straight oxidant gas pipes connected to the incoming oxidant gas pipe. The exits of these oxidant gas pipes are distributed on the cross section so to match the process gas plug flow. Very little oxidant gas pressure drop is spent because the tubes are straight and parallel to the incoming pipe, and because the oxidant gas velocity in the pipes is kept fairly low. Each oxidant gas pipe is equipped with a special nozzle formed to have an oval or flat cross section at its opening. This is important in order to decrease mixing length downstream because the flat jet mixes into the process gas stream more effectively than a circular jet does. The orientation of the nozzles (they are not rotational symmetrical) is chosen so that the shape of the oxidant gas jets in combination with the position matches the amount of process gas flow everywhere on the cross section, as earlier described.

A prerequisite for designing the layout of the oxidant gas nozzles is knowledge of the process gas flow on the cross section, as this is needed to balance the amounts of oxidant gas and process gas locally. It is ideal to create plug flow conditions on the process gas side, so that the flow speed is constant throughout the cross section. Not only does this make it easier to lay out the oxidant gas nozzles (basically the oxidant gas pipes should then just be geometrically uniformly distributed), but the maximum flow speed on the cross section becomes the lowest possible. This situation is as far away (largest margin) from the critical situation of having areas of recirculation (back flow) near the oxidant gas pipe nozzles. Recirculation or backflow close to the nozzle where the oxidant gas is injected and starts to combust can lead to very high temperatures near to the metallic nozzles causing them to melt or otherwise disintegrate.

The process gas inlet to most secondary reformers is from the side, and special means are needed to create a downward flowing plug flow in the neck of the secondary reformer. The invention uses two perforated plates instead of the normal solution of having one perforated plate. This serves to make a better flow distribution of the process gas while spending less pressure drop compared to the normal solution using one perforated plate. Further the burner is installed in a refractory lined vessel so a very small clearance between the perforated plate and the refractory wall is unpractical, as the dimensional tolerances on the refractory parts are large. We must accept a larger clearance at the wall, but this means a leak flow here, which is unwanted, as it is not in line with creating a plug flow. This unwanted effect becomes less severe when two perforated plates are used in series compared to using just one perforated plate having twice the pressure drop of each of the perforated plates arranged in series.

A significant technique used to achieve the process gas plug flow is to have long oxidant gas pipes, and allow the process gas to flow into the space available between them while the process gas rectifies into a plug flow pattern.

A first aspect of the invention is a burner which is suited for a catalytic reactor, but it can also be used for other chemical reactors. The burner comprises an oxidant gas inlet. The oxidant may be air. More than one oxidant gas inlet may be used, but one is preferred to lower costs and pressure drop. The oxidant gas inlet may comprise a pipe entering the catalytic reactor, in one embodiment in the top of the reactor body. A plurality of oxidant gas pipes are connected to the oxidant gas inlet at their upstream end. In one embodiment the pipes are connected to the lower, downstream end of the single pipe which comprises the oxidant gas inlet. An oxidant nozzle is located at the downstream end of each pipe. The burner also comprises a process gas inlet. The process gas inlet may also in one embodiment comprise a single pipe which may in one embodiment be located at the side of the top of the reactor. The oxidant gas pipes are arranged with sufficient spacing between the downstream end of adjacent pipes to ensure that the process gas can flow between the pipes before mixing with the oxidant gas downstream the oxidant nozzles. The length of each oxidant gas pipe is at least five times the inner diameter of the pipe.

In an embodiment of the invention a plurality of the oxidant nozzles have a non-circular outlet opening cross-section. The non-circular outlet openings improve the mixing of oxidant gas with process gas as compared to a circular outlet opening. In a particular embodiment of the invention, the oxidant nozzles have an oval outlet opening cross section. The non-circular openings may be provided by pressing the outlet openings of the pipes from at least two opposing sides to achieve a plastic deformation.

In an embodiment of the invention, the gas flow in the reactor is optimized by orienting the outlet oxidant gas flow from the burner in different, not parallel directions. In this way, the gas flow of the oxidant gas as well as the process gas mixed with the oxidant gas may be adapted to the shape and volume of the reactor downstream the burner.

To further enhance the mixing of oxidant gas and process gas, at least one, preferably two perforated plates are located between the process gas inlet and the oxidant nozzle outlet openings. This balances the process gas flow across the cross section of the burner towards the ideal situation of plug flow. By having more than one perforated plate, this is achieved by a minimum of pressure loss on the process gas side of the burner and thus also minimizing the by-pass process gas flow which may occur between the outside diameter of the perforated plates and the inside diameter of the reactor wall due to dimensional tolerances.

In an embodiment of the invention, to ensure even flow distribution of the process gas, the distance between the two perforated plates is at least one quarter of the diameter of the perforated plates. In this way a minimum length to area ratio is ensured for the distance between the two perforated plates as compared to the area they cover. The perforated plates may not be of the same diameter; in that case the distance between the two perforated plates should be at least half the diameter of the smallest perforated plate, which in reality often will be the perforated plate closest to the process gas inlet.

In a further embodiment of the invention, the oxidant gas pipes are arranged to have oxidant flow directions which are less than 45° to the flow direction of the oxidant gas inlet, preferably the upstream end of the oxidant gas pipes have oxidant gas flow directions which are less than 10° from the oxidant gas flow direction in the oxidant gas inlet.

In an embodiment of the invention, an even distribution of the process gas flow between the oxidant gas pipes (and thus a high degree of mixing of oxidant and process gas downstream the oxidant nozzles) is provided by having 3 or more than 3 oxidant gas pipes, and in a further embodiment by having oxidant gas pipes with a length of at least 20 mm to ensure sufficient downstream space for the distribution of the process gas between the oxidant gas pipes.

A second aspect of the invention is a method for burning a process gas in a catalytic reactor. Two gas streams are provided to a burner installed in the reactor, for instance in the top of the reactor. A first stream comprises oxidant; this is provided to the oxidant gas inlet of the burner. The second stream comprises a process gas which is provided to the process gas inlet of the burner. From the oxidant gas inlet, the first stream flows through a plurality of oxidant gas pipes which at their upstream end are connected to the oxidant gas inlet, providing gas flow passage from the oxidant gas inlet and through each of the pipes. The oxidant gas flows further through the pipes to and out through an oxidant nozzle arranged at each downstream end of the pipes. The nozzle has a non-circular outlet which gives the oxidant gas leaving the nozzles a "flattened" cross section and therefore a larger surface to cross sectional area ratio compare to if the cross section of the outflowing oxidant gas was circular (this enhances the mixing with the process gas). The nozzles may be separate units connected to the pipes, or they may be the end part of the pipes which have been made non-circular. The second gas stream flows from the process gas inlet further into the burner where it distributes evenly to the full cross section of the burner. This is possible because the pipes are arranged with sufficient spacing between them and in particular between the downstream end of adjacent pipes to allow and ensure that the second stream flows between the pipes. Downstream the burner, when the second stream has been distributed evenly across the cross section of the burner, the second stream passes the outlet opening of the nozzles and the first and the second stream are mixed.

In a further embodiment of the second aspect of the invention, the second stream passes at least two perforated plates which are located between the process gas inlet and the oxidant nozzle outlet openings. The second stream is thereby more effectively distributed evenly to the whole cross section of the burner in a short distance, which saves space and material costs.

In a further aspect of the invention, the burner as described above is used to carry out catalytic processes in a chemical reactor. In yet a more particular embodiment of this third aspect of the invention, the chemical reactor is a secondary reformer in an ammonia plant.

DETAILED DESCRIPTION OF THE INVENTION

Figure 1:
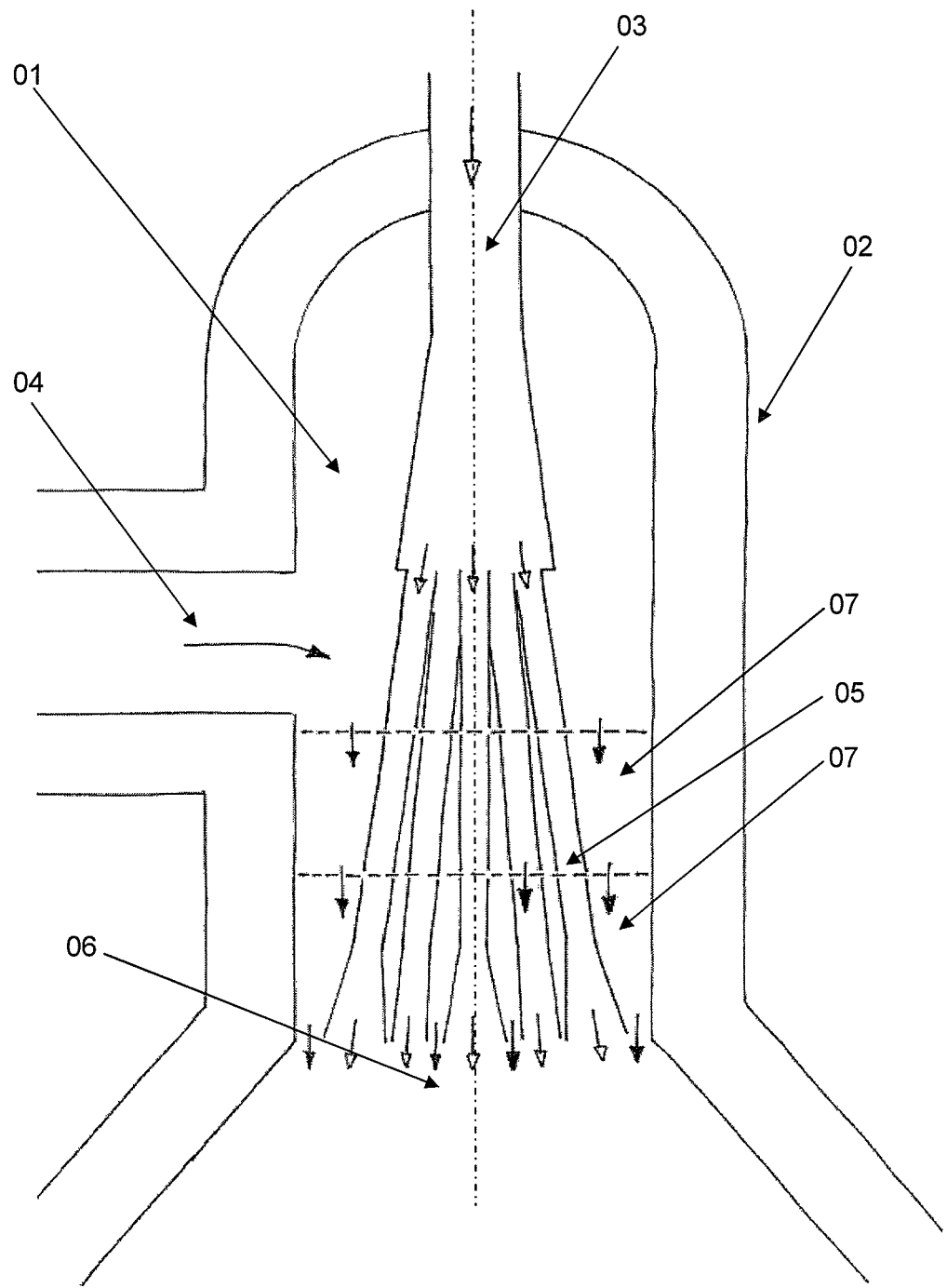
FIG. 1 shows a cross sectional side view of the burner of the present invention.

Referring to FIG. 1, the burner 01 of the present invention is mounted in the top of a catalytic reactor 02 which is cylindrical and has a reduced diameter in the top section.

Oxidant gas enters the burner through the oxidant gas inlet 03, a central single pipe mounted in the very top of the reactor. Through the oxidant gas inlet the oxidant gas flows further down via a plurality of oxidant gas pipes 05 which at their upstream end are connected to the downstream end of the central pipe constituting the oxidant gas inlet. As can be seen on the figure, the flow direction of the oxidant gas in each of the plurality of oxidant gas pipes is substantially the same as the flow direction of the oxidant gas in the central oxidant gas inlet pipe. This entails a low pressure drop on the oxidant gas side of the burner.

From the upstream to the downstream end of the oxidant gas pipes the distance between adjacent pipes increases, thereby distributing the oxidant gas evenly over the total cross sectional area at the points where the oxidant gas flows out of the burner and into the reactor via the oxidant nozzles 06 which are located one at each of the downstream end of the plurality of oxidant gas pipes. Further, this increased spacing between adjacent oxidant gas pipes allows and ensures that process gas flows between the gas pipes.

Process gas enters the burner via the process gas inlet 04 located at the side of the top of the catalytic reactor. The process gas inlet comprises a single pipe which provides process gas flow perpendicular to the axis of the burner, the oxidant gas inlet and the reactor. This contributes to even distribution of the process gas throughout the cross sectional area of the burner before the process gas enters the reactor downstream the burner and the oxidant nozzle outlets. To further enhance the even distribution of the process gas, two perforated plates 07 are located between the process gas inlet and the oxidant nozzle outlet openings. The perforated plates provide a pressure drop, a "braking barrier" which forces the process gas to distribute. Two perforated plates work more efficient than one, since better distribution providing substantially plug flow of the process gas can be achieved with the same or a lower total pressure drop than if only one perforated plate is used. Further, by-pass due to tolerances between the outer diameter of the perforated plates and the inner top reactor wall is reduced as compared with a single perforated plate.

Figure 2:
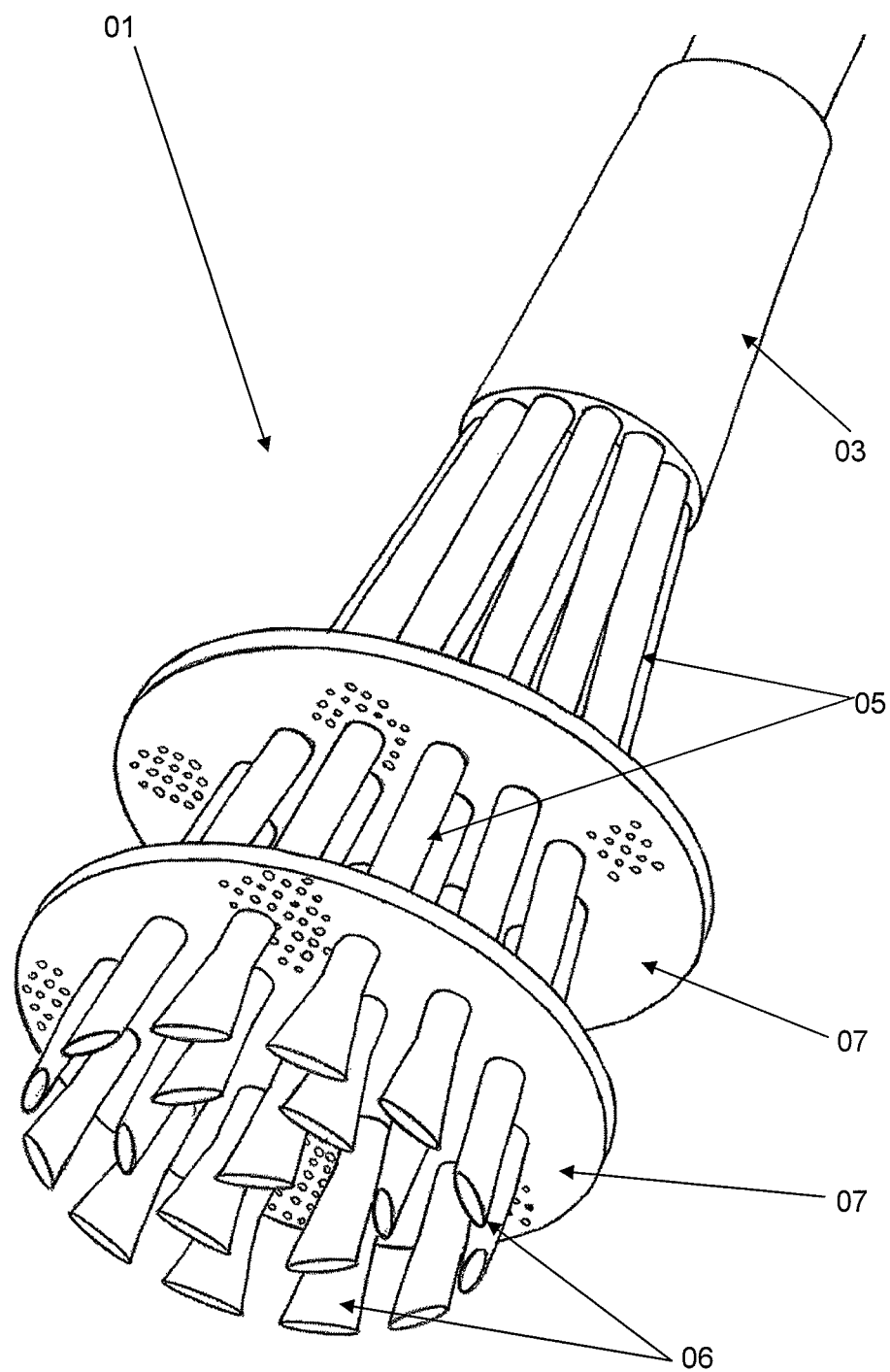
FIG. 2 shows an isometric view of the burner of the present invention, without showing the reactor or the process gas inlet.

When the evenly distributed process gas downstream the two perforated plates finally reaches the oxidant nozzle outlets, it has substantially plug-flow. The oxidant nozzles have an oval outlet opening cross-section as can be more clearly seen on FIG. 2, which is an isometric view of the burner without showing the reactor or the process gas inlet. The oval outlet opening cross-section provides a larger surface to area ratio of each of the oxidant gas streams in the mixing zone and therefore provides more efficient mixing with the process gas.

EXAMPLE

An investigation of the proposed concept of the invention compared to the original design ring burner was made using CFD. The base case (stream data) used origins from an actual plant.

The investigation showed that the pressure loss on the process gas side of the burner of the present invention as compared to the conventional ring nozzle burner was 22.3% lower. The pressure loss on the air side of the burner of the present invention as compared to the conventional ring nozzle burner was 80.3% lower.

It is seen that the new burner concept of the present invention provides a massive reduction of the air side pressure drop.

It is also clear that the new burner concept of the present invention has a material evaporation potential, because the maximum temperature has been lowered.

On the gas side pressure drop, we also have achieved a reduction. However, the gas side pressure drops for both the ring burner and the new burner concept of the present invention have quite low absolute values.

In conclusion, it can be said that from a flow perspective, the present invention provide a significantly improved burner.

What is claimed is:

1. Burner for a catalytic reactor comprising:
   an oxidant gas inlet aligned along a flow axis and having a discharge end,
   at least one perforated plate orthogonally arranged to said flow axis,
   a plurality of oxidant gas pipes having first ends arranged upstream of said plate and second ends comprising oxidant nozzles arranged downstream of said plate, and said plurality pipes have a length that extends from said first ends to said second ends, each of said oxidant gas pipes having a single feed inlet, said first ends of the oxidant gas pipes being connected to said discharge end of the oxidant gas inlet,
   a process gas inlet arranged to introduce process gas orthogonal to said flow axis and upstream of said plate, wherein the plurality of oxidant pipes are spaced from one another along the length of said plurality of pipes extending between said first ends and said oxidant nozzles such that orthogonal spacing between adjacent pipes increases along said length from said first ends towards said nozzles to ensure that the process gas flows between and external to the pipes before mixing with the oxidant gas, each pipe having a length that is at least five times an inner diameter of the pipe.

2. Burner according to claim 1, wherein each oxidant nozzle has a non-circular outlet opening cross-section.

3. Burner according to claim 2, wherein said non-circular outlet opening cross section is oval.

4. Burner according to claim 2, wherein said oxidant nozzle non-circular outlet opening cross sections are achieved by pressing the outlet of the pipes from at least two opposing sides until a plastic deformation of said pipes is achieved.

5. Burner according to claim 1, wherein the orientation of each pipe and corresponding oxidant nozzle define an oxidant gas outlet direction and wherein the outlet direction of at least two oxidant nozzles are not parallel.

6. Burner according to claim 1, comprising two of said perforated plates, each having a diameter, located between the process gas inlet and the oxidant nozzles outlet openings, thereby balancing the process gas flow across the cross section of the burner to form a plug flow but minimizing the pressure loss caused by the perforated plates.

7. Burner according to claim 6, wherein the distance between the two perforated plates is at least one quarter of the diameter of the perforated plate located closest to the process gas inlet.

8. Burner according to claim 1, wherein the oxidant gas pipes are arranged so the flow direction in the oxidant gas pipes are non-parallel at an angle less than 45° C. to the flow direction in the oxidant gas inlet.

9. Burner according to claim 1, wherein the number of oxidant gas pipes is three or greater.

10. Burner according to claim 1, wherein the at least one perforated plate has perforations which are evenly distributed over the cross sectional area of said perforated plate, thereby providing a balanced pressure drop over said cross sectional area.

11. A method for burning a process gas in a catalytic reactor comprising the steps of:
   providing a first stream comprising oxidant to an oxidant gas inlet of a burner installed in the catalytic reactor,
   providing a second stream comprising process gas to a process gas inlet arranged orthogonal to an axis of the burner,
   flowing the first stream from the oxidant gas inlet, through a plurality of oxidant gas pipes connected to the oxidant gas inlet at their upstream end and through an oxidant nozzle with non-circular outlet opening cross-section, arranged at the downstream end of each pipe,
   flowing the second stream from the process gas inlet, between and external to the pipes from the upstream end to the downstream end of the pipes, which pipes are arranged with sufficient and increasing spacing between the upstream end of the oxidant gas pipes and downstream end of adjacent oxidant gas pipes to ensure that the second stream can flow between the pipes, and
   mixing the first and the second streams in the zone downstream of the outlet of the oxidant nozzles.

12. A method for burning a process gas in a catalytic reactor according to claim 11 further comprising the intermediate step of flowing the second stream through at least two perforated plates located between the process gas inlet and the oxidant nozzle outlet openings, thereby balancing the second stream flow across the cross section of the burner.

13. Use of a burner according to claim 1 for carrying out catalytic processes in a chemical reactor.

14. Use of a burner according to claim 1 for a secondary reformer in an ammonia plant.

15. Burner for a catalytic reactor, said burner comprising an oxidant gas feed inlet aligned along a flow axis, a plurality of oxidant gas pipes each respectively having first inlet ends connecting the oxidant gas feed inlet to split gas flow from said oxidant gas feed inlet, the first inlet ends arranged to provide a first orthogonal pipe spacing between the plurality of pipes, each pipe having a first portion extending from said first inlet ends, a middle portion and a third portion with a distal nozzle downstream of said first and middle portions, a process gas inlet arranged to introduce process gas orthogonal to said flow axis at said first portion, wherein the plurality of pipes are arranged with sufficient spacing between adjacent pipes along an axis length of the third portion to ensure that the process gas flows between and exterior to the plurality of pipes before mixing with the oxidant gas, the length of each pipe is at least five times the inner diameter of the pipe, and wherein the third portions of said pipes are arranged at a second orthogonal spacing greater than said first orthogonal spacing.

16. Burner for a catalytic reactor, said burner comprising an oxidant gas feed inlet aligned along a flow axis, a plurality of oxidant gas pipes each having a length, each pipe respectively having an upstream end at one end of said length and connected the oxidant gas inlet to split gas flow from said oxidant gas feed inlet and a discharge nozzle for oxidant gas at a distal end of said length, a process gas inlet arranged to introduce process gas orthogonal to said flow axis at said upstream ends, wherein at least some of said plurality of pipes are arranged to be non-parallel with one another along said length from the upstream end to the distal end, such that spacing between said discharge nozzles is greater than spacing between said upstream ends of said plurality of pipes.

* * * * *